United States Patent Office 3,408,291
Patented Oct. 29, 1968

3,408,291
METHOD OF SEPARATING CATIONS FROM SOLUTIONS CONTAINING THE SAME
Rainer Thomas and Paul Weber, Siegburg, Germany, assignors to Phrix-Werke Aktiengesellschaft, Hamburg, Germany
No Drawing. Application June 7, 1965, Ser. No. 462,056, now Patent No. 3,347,968, which is a continuation-in-part of abandoned application Ser. No. 232,344, Oct. 18, 1962, which in turn is a continuation-in-part of abandoned application Ser. No. 146,341, Oct. 19, 1961. Divided and this application Aug. 31, 1967, Ser. No. 664,652
Claims priority, application Germany, Oct. 21, 1960, P 25,897; Oct. 20, 1961, P 28,062
11 Claims. (Cl. 210—32)

ABSTRACT OF THE DISCLOSURE

Cations are separated from an aqueous solution containing the same and incorporated in a shaped body, or bodies, by contacting an aqueous liquid, containing in solution a first cation adapted to form a sulfide which is at most slightly soluble in water, with a shaped body of a material adapted to swell in contact with water and having distributed therethrough a sulfide including a cation of lesser affinity to ionic sulfide radicals then the first cation and of greater solubility in water than the sulfide of the first cation, whereby it is accomplished that the shaped body will swell and the sulfide of the first cation will be precipitated throughout the shaped body, and thus the first cation will be separated from the aqueous solution and incorporated in the form of its sulfide in the shaped body.

Cross-references to related applications

The present application is a division of our copending application Serial No. 462,056, filed June 7, 1965, and entitled "Method of Separating Cations From Solutions Containing the Same and for Incorporating Cations Into Bodies of Regenerated Cellulose," now Patent No. 3,347,-968. Application Serial No. 462,056 is a continuation-in-part of our application Serial No. 232,344, filed October 18, 1962 and entitled "Method for Separating Cations from Solutions Containing the Same," now abandoned; and application Serial No. 232,344 is a continuation-in-part of our application Serial No. 146,341, filed October 19, 1961, entitled "Method of Forming Shaped Bodies of Regenerated Cellulose," now abandoned.

Background of the invention

The present invention relates to a simple and effective method for separating certain dissolved cations from solutions thereof, whereby such cations will be incorporated into shaped bodies, generally in the form of a precipitate of sulfides of such cations, and it is also within the scope of the present invention to regenerate the shaped body so that the same may again take up such cation from solutions thereof.

It has been proposed to use zinc sulfide for separating metals from dilute solutions thereof by introducing zinc sulfide into such solutions, whereby the sulfide of the initially dissolved metal will precipitate and the corresponding zinc salt will go into solution. This so-called "zinc sulfide filter method" wil permit at least partly to separate in a zinc sulfide column different metals at spaced levels of the zinc sulfide column in the form of differently colored zones.

It is one of the difficulties and disadvantages of the zinc sulfide column filter method that the particle size of the zinc sulfide must be adjusted to the speed of passage of the solution through the zinc sulfide column. A speed of passage sufficiently fast for practical purposes will cause a rather slow or reduced speed of reaction, due to the fact that the speed of a heterogeneous reaction depends partly on the particle size of the solid phase. In other words, if the particle size of the zinc sulfide particles is sufficiently great to allow for a fast flow of the solution through the column, then the zinc sulfide surface which will come in contact with the solution will be rather small as compared with the zinc sulfide surface that would be available if the size of the individual zinc sulfide particle would be considerably reduced. However, the flow of the solution through such zinc sulfide particles of reduced size would be greatly retarded.

It is therefore an object of the present invention to overcome the above discussed difficulties and disadvantages.

It is a further object of the present invention to provide a simple and effective method for separating certain dissolved cations from aqueous solutions thereof.

Summary of the invention

It is proposed, according to the present invention, to separate cations from solutions, generally aqueous solutions, containing such cations and to incorporate the latter in a shaped body or bodies, by contacting a liquid containing in solution a first cation adapted to form a sulfide which is at most slightly soluble in the liquid, with a shaped body of a material adapted to swell in contact with the liquid and having distributed therethrough a sulfide including a cation of lesser affinity to ionic sulfide radicals than the first cation and of greater solubility in water than the sulfide of the first cation. It will be accomplished thereby that the shaped body or bodies will swell and the sulfide of the first cation will be precipitated throughout the same.

Frequently, the liquid will be an alkaline aqueous liquid and the material of the shaped bodies may be regenerated cellulose or a water soluble cellulose derivative. The shaped bodies may be a mass of coagulated substantially spherical bodies.

The thus obtained bodies having the insoluble compound distributed therethrough may then be treated with hydrogen sulfide or highly water soluble sulfides so that the sulfide of such insoluble compound will be formed and in this manner the sulfide of greater solubility will be reformed in the shaped bodies.

It is also within the scope of the present invention to treat the shaped bodies having the sulfides of the first cation incorporated therein, with a solution of a complex-forming compound adapted to dissolve at least one of the metal compounds of the shaped bodies. Such complex-forming compound, for instance, may be an alkali metal cyanide.

Description of the preferred embodiments

It is possible, according to the present invention, to removal metal ions which form sulfides which are at best difficultly soluble in water, from a solution thereof by contacting such solution with shaped bodies of a substance which is adapted to swell in water, so that the aqueous solution containing the metal ion can penetrate such bodies, and which bodies have incorporated and substantially evenly distributed throughout a sulfide of a cation which will be replaced by the metal ion so that the sulfide of the metal ion will then be distributed through the bodies of said substance. In this manner the metal ion will be removed from its aqueous solution.

The present invention is thus also concerned with incorporating sulfides adapted to react with certain cations, finely distributed in a material which will swell but will not be dissolved in water, and to use the sulfide-containing material for precipitating therein metal ions which will form sulfides which are at best difficultly soluble in water.

In this manner the grain size of the individual metal sulfide particles and thus the speed of the reaction between the same and the dissolved cations will remain constant even if shape and size of the particles of hydrophilic, swellable, sulfide-containing material is changed, i.e., adjusted to the required speed of flow of the solution from which the cation, i.e. the metal ion which will form a difficultly soluble sulfide, is to be removed.

The speed of reaction between the metal sulfide initially incorporated in the bodies of swellable material and the cations which are capable of forming more difficultly soluble sulfides will remain practically unaffected by the hydrophilic medium.

Regenerated cellulose as well as cellulose derivatives such as cellulose ethers and cellulose esters were found to be particularly well suited to form bodies which will be capable of swelling in water and will be permeable by the ions of the aqueous solution, as well as adapted for having incorporated therein the sulfides which are capable of reacting with the dissolved cations.

Metal sulfide-containing cellulose or derivatives thereof may be produced by a spinning or extrusion method such as described further above, so that the swellable material which contains the metal sulfide will be in the shape of fibers or foils. However, it is equally possible to use sulfide-containing bodies of different shape such as spherical bodies or lens-shaped bodies of cellulose derivatives, regenerated cellulose or other materials which are capable to swell in water without being dissolved therein.

Such materials which are capable of swelling in water without being dissolved include starch, gelatin, glycogen, proteins, pectin and many polymerization products such as certain rubber products, polystyrene, polyacrylic ester, polyvinyl chloride and other polyvinyl compounds. All of these materials can be shaped in known manner into fibers or films, whereby it is also possible during the shaping to distribute metal sulfides therethrough in accordance with the present invention.

The shaping, in the case of cellulose ethers, starch, gelatin, glycogen, pectin and protein is essentially carried out in such a manner that the material is dissolved in dilute alkali hydroxide, for instance in 7% aqueous sodium hydroxide and is then spun or extruded into a bath of weak acid or acid and salts, wherein the material coagulates. Cellulose acetate is generally spun from a solution thereof in acetone, and usually in dry condition, i.e. the acetone is permitted to evaporate. Materials such as rubber, polyacrylic ester, polyvinyl chloride and the like are usually dissolved in organic solvents such as benzene, carbon tetrachloride or the like and shaped into fibers, either by allowing the solvent to evaporate from the extruded or spun material, or by washing the extruded material with solvent of low boiling point, such as acetone, alcohol or the like.

The shaping of materials which are capable to swell in water is well known per se and is described in more detail in the literature, for instance in the German text by Pummerer, entitled "Chemische Textilfasern, Filme and Folien" published in Stuttgart in 1953.

In the case of cellulose xanthogenate solution as the starting material for producing sulfide-containing shaped bodies, the sulfide ions are already present in the solution. When then to such viscose metal salts are added which will form only in an acidic medium with the already present sulfide ions difficulty soluble sulfides, such as compounds of arsenic, antimony and tin then, upon extrusion of the xanthogenate solution which includes these compounds, into a coagulating or precipitating bath containing sulfuric acid, it will be accomplished that the sulfides will be precipitated within the coagulating cellulose in very fine distribution. The hydrated regenerated cellulose will prevent an enlargement of the individual sulfide particles and thus the high reactivity of the precipitated sulfides, which is primarily due to the relatively large surface area of the relatively very small individual particles, will be maintained even after further reaction. The amount of metal salts such as arsenic, antimony or tin compounds which may be thus mixed into the viscose may vary within very wide limits, for instance between 1 and 30%. However, preferably between 3 and 25% or most preferably between 5 and 12% of such metal salt will be contained in the viscose fibers or the like.

Shaped bodies of cellulose derivatives may be formed by introducing into an alkaline solution thereof stoichiometric quantities of an alkali metal sulfide and of an arsenic compound, and then coagulating the cellulose derivative with acid.

Lens-shaped bodies are obtained by introducing droplets of an about 5% solution of thioarsenide-containing regenerated cellulose or cellulose derivatives into a coagulating bath. By emulsifying such solution in a medium which is not miscible with water and coagulating the thus formed droplets with an acid which is soluble in the phase which is not miscible with water, for instance with acetic acid, it is possible to obtain spherical bodies of about 1 mm. diameter.

The speed of reaction of the metal sulfides which are precipitated together with the cellulose or cellulose derivatives or the like, of which arsenic sulfide appears to be one of the most important, can be considerably improved by reacting the initially precipitated arsenic sulfide with other cations, the sulfides of which possess a higher reaction speed at room temperature than the arsenic sulfide. Such other cations which are used to replace the arsenic of the sulfide preferably will be such which in addition to being able to replace the arsenic, can be easily replaced by cations of the type which are to be removed from a solution containing the same. Cations which are suitable for this purpose, i.e., for replacing the arsenic or the like generally include nickel, cobalt, iron, zinc, thallium, cadmium, and also others, depending on the type of cation which subsequently is to be removed from a solution.

In order that a reaction will take place between the metal sulfide incorporated in the body capable of swelling in water and the cation dissolved in an aqueous solution, it is necessary that the compound which will be formed by such reaction, i.e., the sulfide of the dissolved cation will be less soluble in water than the metal sulfide which was distributed through the body of swellable material. For instance, a dissolved cation will react with zinc sulfide only if the solubility product of the sulfide of the cation is smaller than the solubility product of zinc sulfide. However, due to the complex nature of some of such reactions, the sequence of the solubility of the metal sulfides does not without exception indicate the sequence in which the same are capable of reacting.

Metals may be arranged in the following sequence or replacement series in which they are capable of replacing each other from their sulfides:

Gold, osmium, ruthenium, palladium, mercury, silver, bismuth, copper, lead, cadmium, thallium, zinc (iron, cobalt, nickel); iron, cobalt and nickel and being interchangeable.

The first mentioned metals of the series are capable of replacing the later mentioned metals from the sulfides thereof. Thus, for instance, when iron sulfide is incorporated in a material capable of swelling in water, then such iron sulfide will react with dissolved ions of all of the metals listed above with the exception of cobalt and nickel.

The ability of the swellable material to bind metal ions is controlled by the content of reactive metal sulfide therein, which may be adjusted, for instance, by controlling the amount or proportion of the metal which is introduced during or before the forming of the shaped body. A proportion of 1.6% of sulfidic sulfur in the material capable of swelling with water corresponds, in a stoichiometrically proceeding reaction to a capacity of 1 mval. per gram. It will be understood that "val." is meant to denote the equivalent weight, i.e., the molecular weight divided by the valence. Thus, "mval." denotes $1/1000$ of the equivalent weight. By indicating the capacity as "1 mval. per gram," it is thus indicated that per gram of the material $1/1000$ of the equivalent weight of the reacting compound can be reacted. For instance, when the material contains 1.6% of sulfidic sulfur, in view of the molecular weight of sulfur which is equal to 32 and the valence of the sulfidic sulfur which is 2, the material which contains 1.6% sulfidic sulfur and has a capacity of 1 mval. per gram, will be capable of reacting with $1/1000$ of the equivalent weight of any substance including a cation which under the prevailing conditions can be bound as sulfide.

Generally, when fibrous or foil-shaped bodies of regenerated cellulose or cellulose derivatives are to be used according to the present invention, an addition of between 8 and 12% of arsenic trioxide relative to the weight of alpha cellulose in, for instance, the viscose will give the desired result. The thus obtained material contains between 2.8 and 3.6% of sulfur and has an average capacity of about 2 mval. per gram.

However, by using different methods of producing the shaped bodies, it is possible to obtain shaped bodies which contain considerably larger proportions of metal sulfide. Thus, spherical bodies may be produced which contain the sulfide formed of about 20% arsenic trioxide in the material and this will correspond to a theoretical capacity of 4.85 mval. per gram.

The metal ions-binding material is exhausted when the reacting metal sulfide thereof is completely reacted. Sometimes these reactions actually take place in nearly stoichiometrical proportions. However, due to the possibility that mixed salts will be formed or due to the reducing effect of the sulfide ion which might lead to precipitation of the metal per se, the capacity of the metal ion-binding material according to the invention may in fact be greater than that which would be calculated from the sulfur or metal content thereof. Such mixed salts which may be formed are mainly basic salts such as a mixture of lead sulfide and lead hydroxide, whereby the lead hydroxide is adsorbed or bond on the lead sulfide. Easily reductable noble metals ions (for instance gold ions) may precipitate as metals in the ion binding material.

The breakthrough capacity of the sulfide-containing material which is adapted to swell in water grows with increasing distance of the relative position of the metal of the sulfide in the swellable material from the metal of the solution which is to be removed from the solution, in the replacement series of metals described further above. Thus, the maximum breakthrough capacity, i.e., the maximum capacity prior to breakthrough of the solution, or in other words, maximum capacity of taking up dissolved metal up to the point when the dissolved metal-containing solution passes through the sulfide-containing column of swellable material without being reacted at all, theoretically will be found in the combination of a swellable material containing an iron sulfide and gold cations which are to be removed from a solution thereof. The chemical stability of the sulfide-containing swellable material depends on the type of the metal sulfide distributed therethrough. For instance, zinc sulfide and ferrous sulfide can be used only within a pH range of between 4 and 14 since at a lower pH, i.e., greater acidity of the solution, these sulfides will become soluble. Arsenic sulfide is soluble in alkaline solutions and therefore can be used only within a pH range of between 0 and 7.5. Furthermore, the usefulness of the sulfide-containing material in strongly acidic solutions is limited by the chemical attack of such strongly acidic solutions on the swellable material. The metal sulfides, furthermore, vary in their sensitivity against oxidation. While, for instance, silver sulfide and copper sulfide are highly resistant against oxidizing agents, iron sulfide in moist condition will be oxidized by the oxygen of the air.

The temperature resistance of the material depends on the qualities of the swellable material or carrier substance. For instance, in the case of regenerated cellulose and cellulose derivatives, the sulfide-containing material will be useful up to a temperature of about 120° C. Starch, gellatin, cellulose ethers, pectin, protein also will be suitable for use only up to a temperature which do not substantially exceed 120° C. However, polymerizates such as polystyrene, or rubber or polyacrylic ester, polyvinyl chloride and the like may be used at temperatures up to 160° C. or possibly even somewhat higher. Obviously the usefulness of the sulfur-containing material at higher temperatures depends on the melting point of such swellable materials or on the temperature at which the material is changed in its physical or in its chemical characteristics.

The selectivity of the ion-binding sulfide with respect to heavy metal ions can be increased by choosing a metal sulfide which, in the above described replacement series, is sufficiently distant from the metal, the ion of which is to be bound. By interconnecting several ion binding materials, which include sulfides of metals taken from different portions of the replacement series, it will become possible to bind and hold different metal ions at different portions of the column.

Regeneration of the ion-binding material according to the present invention depends on two conditions:

(1) The cation of the reacting metal sulfide must be capable of forming during the reaction a compound which is at best only difficultly soluble in the solution from which a cation is to be removed, so that the thus formed compound will not be washed out of the column.

(2) After exhaustion of the ion-binding material, it must be possible to reconvert the thus formed difficultly soluble compound in a relatively simple manner into the sulfide of the metal thereof.

These conditions are primarily met by lead sulfide, iron sulfide and silver sulfide.

Lead remains in the material which is adapted to swell in contact with water, provided that the solution of the reaction, i.e., the solution containing the metal ion which is to be bound, also contains sulfate ions, or if an ammoniacalic solution is used.

When the more reactive FeS is used as the metal ion-binding metal sulfide, the solution should contain OH ions in order to achieve that the ion which is displaced from its sulfide, i.e., iron, will remain insoluble in the swellable carrier material.

Silver sulfide will remain in the hydrophilic carrier material in the form of insoluble compounds provided that chlorine ions or an excess of alkali are present. However, in view of its location in the replacement series, silver sulfide is only suitable for binding mercury and nobler metals.

Pb(OH)$_2$, Fe(OH)$_3$ and Ag$_2$O react easily with hydrogen sulfide and sodium sulfide solutions, whereby the sulfides of lead, iron and silver are reconstituted. In this manner, it is possible to regenerate the ion-binding material repeatedly, until the limit of acceptance of the material for the precipitated metal sulfide, i.e. the sulfide of the cation which had to be removed from a solution thereof, has been reached.

By regenerating with sodium sulfide solutions, small quantities of the metal sulfide will tend to form colloidal solutions. For this reason, it is more practical to regenerate with gaseous hydrogen sulfide, by blowing hydrogen sulfide through the column containing the ion-binding material, of course after withdrawal of the solution and washing out of dissolved ions. Hydrogen sulfide is blown through the column until the end of the regeneration is indicated by the passage of unreacted hydrogen sulfide through the entire column. Thereafter, the column is washed with water in the direction from its lower end toward its upper end so as to preferably completely replace any air in the column with water, and until the column is freed of unreacted hydrogen sulfide. The thus treated column may be used again for the binding of metal ions. Preferably, at the upper end of the column a vacuum is applied in order to facilitate the filling of the column with water or cation-containing solution without retaining gas bubbles therein. Prolonged contact of the regenerated ion-binding material with air should be avoided in order to prevent oxidation of the metal sulfides therein, which, particularly in the case of ferrous sulfide, would take place rather quickly.

The reactions described above correspond substantially to the following four equations which will serve to illustrate the binding of metal ions by the sulfide-containing material and the regeneration of the material.

(1) $CuSO_4 + PbS \rightarrow CuS + PbSO_4$
(2) $PbSO_4 + Na_2S \rightarrow PbS + Na_2SO_4$
(3) $Cu(NH_3)_4SO_4 + FeS + H_2O \rightarrow CuS + Fe(OH)_2 + 2NH_3 + (NH_4)_2SO_4$
(4) $Fe(OH)_2 + H_2S \rightarrow FeS + 2H_2O$ Equation 1 represents the reaction which takes place during the binding of copper from a dilute copper sulfate solution, using a lead sulfide-containing swellable material. It will be seen that copper sulfide and lead sulfate are formed, the latter being insoluble under the reaction conditions. After the ion-binding material has been exhausted, it is regenerated by reacting the lead sulfate with sodium sulfide, while the copper sulfide remains in the material. During this reaction, as shown in Equation 2, lead sulfide and sodium sulfate are formed and the latter is then washed out so that the ion-binding materials now again will contain lead sulfide and thus will be ready to accept additional amounts of copper ions.

According to Equations 3 and 4, an iron sulfide-containing ion-binding material is used to retain copper from a copper ammonium sulfate solution. In this manner copper sulfide and iron hydroxide are formed. The regeneration of the iron hydroxide is then carried out with hydrogen sulfide so as to transform the iron hydroxide into iron sulfide. The copper sulfide which already has been deposited in the swellable material will remain therein and the now again iron sulfide-containing swellable material is capable of binding additional quantities of copper.

Use of lead sulfide as the metal ion-binding material is particularly indicated when such metal ions are to be removed from sulfate-containing waste waters. However, such solution must contain only relatively few H-ions, i.e. should have a pH of 3 or higher, since in the presence of stronger acid the capacity of the ion-binder upon repeated regeneration will be quickly reduced. Lead sulfide can be used only for the separation of copper, bismuth, silver, mercury and nobler metals.

The use of iron sulfide as the reactive sulfide has certain advantages as compared to the use of lead sulfide, particularly its greater reactivity, since with the help of iron sulfide also lead, cadmium, thallium, and to some extent zinc can be bound. The speed of reaction is greater so that in a given column a greater amount of metal ions-containing solution can be treated per unit of time. Since most metals such as silver, copper, lead, cadmium and zinc either form soluble amines, or alkali-soluble hydroxides, it is generally easily possible to comply with the requirement that an excess of hydroxyl ions should be present in the solutions which are to be treated with ion sulfide.

Instead of the above described regeneration of the metal ions-binding material, it is also possible to eluate the ion-binding materials after the same have been more or less fully charged with sulfides of the metal which had to be removed from a solution, in such a manner that after such elution the ion-binding material may be further used.

This can be accomplished in two ways, namely:

(1) The sulfides which are precipitated in the ion-binding material are dissolved with the exception of one, and the thus remaining sulfide may then be further used for binding metal ions.

(2) The eluating agent contains a suitable metal compound which will form an insoluble sulfide with the sulfide ions which are formed upon dissolution of the previously formed metal sulfide. The thus formed insoluble metal sulfide will remain in the swellable binder material and should be capable of reacting with further quantities of metal ion-containing solution.

The foregoing may be illustrated by the following equations.

(5) $2Pb(OH)_2 + 2CuS + 10 NaCN + 2H_2O = 2PbS + 2Na_3[Cu(CN)_4] + 2NaOH + (COONa)_2 + 2NH_3$ (6) $2CuS + 2NaCN + 2NaOH + 2H_2O + 2Na_2[Pb(CN)_4] \rightarrow 2PbS + 2Na_3[Cu(CN)_4] + (COONa)_2 + 2NH_3$ According to Equation 5 it is assumed that lead sulfide-containing ion-binding material was used to retain copper in alkaline solution. Thus, copper sulfide and lead hydroxide were formed. The exhausted ion binder is then washed with sodium cyanide solution, the thereby soluble sodium copper cyanide and lead sulfide are formed, so that the ion binder is reconstituted to its original condition. The simultaneously formed sodium hydroxide, ammonia and sodium oxalate are washed out together with the sodium copper cyanide.

According to Equation 6 it is assumed that the ion binder, initially contained, for instance, iron sulfide and was used for separating copper from a copper sulfate solution. Thereby, soluble iron sulfate was formed and copper sulfide precipitated in the ion binder. If the ion binder would now be washed with sodium cyanide solution, the copper would be dissolved and no metal would be retained in the ion binder. For this reason, in this case, a water soluble lead compound is added to the wash solution so that soluble sodium copper cyanide and insoluble lead sulfide will be formed, in addition to ammonia and soluble sodium oxalate. Upon washing out the soluble compounds, the ion binder will contain lead sulfide and will be capable to retain such metal ions which are capable to displace the lead of the lead sulfide.

The method according to Equation 5 is perfectly suitable for lead-containing ion binding material. Compounds of copper, silver and gold are easily soluble in solutions of alkali metal cyanides, (particularly in the presence of a small proportion of hydrogen peroxide), while in the presence of the sulfide ions formed during elution with sodium cyanide or the like, the lead compounds will be converted into lead sulfide which is insoluble in sodium cyanide. After such elution, the ion binding material can be used again.

According to Equation 6, the cyanide solution which is used for eluating the material contains lead, cadmium or zinc compounds so that sulfides thereof will be precipitated in the swellable material in place of the eluated compound.

Due to the fact that iron compounds form soluble complex compounds with cyanide, it is not possible to eluate iron sulfide-containing ion binding material in the above described manner. In the case of iron sulfide-containing materials, regeneration will preferably be carried out with sodium sulfide or hydrogen sulfide as described further above, and may be repeated until the volume of the ion binding material has been increased due to the accumulation of precipitated metal sulfides, to such an extent that the through flow speed of the metal ions-containing solution is unduly reduced. The working-up of such exhausted ion binding material can be carried out by dissolving the sulfides or by combustion of the material, of course in either case the material cannot be further used for its initial purpose.

It is a particular advantage of the ion binding materials according to the present invention that the same have a selective effect with respect to different cations which is independent of the type, quantity and valence of other cations which may be present in the metal ions-containing solution. The selectivity can be increased by suitably choosing the reacting sulfide in the metal ions binding material, in accordance with the replacement series described further above. Furthermore, due to the possibility of re-activating the ion binding material, without thereby dissolving the previously bound metal cation, it is possible to greatly increase the concentration of the bound cation in the ion binding material and thus to carry out the recovery of the thus bound cation under particularly advantageous conditions.

The following examples are given as illustrative only of the present invention, without, however, limiting the invention to the specific details of the examples.

EXAMPLE I (a) Production of an iron sulfide-containing ion binder.—Arsenic trioxide is admixed to viscose in an amount equal to 8% of the alpha-cellulose of the viscose and thereafter fibers are sun thereof in conventional manner, having a titer of 7 denier. Upon subsequent treatment of the decomposed viscose fibers and cutting of the same into very short staple fibers, desulfurization and bleaching of the material is omitted.

The thus obtained yellow-colored staple fibers contain 4.78% arsenic trioxide and 2.80% sulfur in the form of $As_2S_3$ and $As_2S_5$.

20 g. of these arsenic-containing staple fibers are heated together with 10.4 grams of Mohr salt $$(NH_4)_2Fe(SO_4)_2 \cdot 6(H_2O)$$

and 20 grams sodium acetate $(CH_3COONa \cdot 3H_2O)$ in between 800 and 1000 ml. of water, in the presence of a wetting agent, to a temperature of 70° C., whereupon a reaction takes place and the color of the fibers will change to black. During 30 minutes, under frequent stirring, the mixture is further heated from 70° C. to about 95° C. and thereafter maintained at boiling temperature for 10 minutes. Finally, the thus treated staple fibers are washed with water and subjected to a softening treatment, for instance, as described in the text "Chemiefasern" by K. Goetze, second edition, 1951, pages 572 to 612.

The thus treated fibers contain the equivalent of 4.59% $Fe_2O_3$. The moist material may be used immediately as binder for metal ions. However, if the material is dried because it is intended for use at some later time, it will be observed that the initially deep black fibers will change at least partially to a brown color thus indicating that the black FeS has been changed by oxidation due to contact with air to $Fe(OH)_3$.

20 g. of the thus produced dried staple fibers are moistened and treated in a glass tube, having a diameter of 20 mm., with a stream of hydrogen sulfide, until a cadmium solution contacted by gas leaving the glass tube will indicate that hydrogen sulfide passes from the glass tube into the cadmium solution. Thereupon passage of hydrogen sulfide through the glass tube which is filled with the moist staple fibers is continued for another 2 minutes and then suction is applied to the upper end of the glass tube while from the lower end thereof water is slowly allowed to flow into the tube. In this manner, it is achieved that the fibers-containing glass tube will be filled with water substantially free of gas bubbles. After washing of the thus formed fiber column until the spent wash water is free of hydrogen sulfide, the ion binding column is ready for use.

(b) Binding of copper from a cuprammonium solution.—An aqueous $n/10$ solution of $(Cu(NH_3)_4)SO_4$ is passed through the thus prepared column until a blue color appears in the liquid leaving the column. The ion binding material is then washed until neutral.

The thus obtained column of neutral copper-containing material is regenerated with hydrogen sulfide as described further above and after washing so as to remove any free hydrogen sulfide may be reused for the binding of copper.

The iron sulfide will be transformed during the reaction with the alkaline copper solution into hydroxide and the iron hydroxide which remains in the ion binding material is then transformed by reaction with sodium sulfide or hydrogen sulfide into iron sulfide so that the ion binding material is reactivated.

The reactions which take place according to the present example are summarized in the following equations:

(7) $3(NH_4)_2Fe(SO_4)_2 + As_2S_3 + 6H_2O$
    $+ 6CH_3COONa = 3FeS + 2H_3AsO_3$
    $+ 3(NH_4)_2SO_4 + 6CH_3COOH + 3Na_2SO_4$ (8) $2Fe(OH)_3 + 3H_2S = 2FeS + S + 6H_2O$ (9) $FeS + Cu(NH_3)_4SO_4 + 2H_2O = CuS$
    $+ Fe(OH)_2 + (NH_4)_2SO_4 + 2NH_3$

Equation 7 indicates reaction of the arsenic sulfide-containing fiber with iron ammonium sulfate so as to obtain an iron sulfide-containing fiber. By buffering with sodium acetate the formated sulfuric acid is transformed into the softer acetic acid.

Equation 8 illustrates formation of iron sulfide from the iron hydroxide of the fiber.

Equation 9 shows how the iron sulfide will bind copper from ammoniacalic copper sulfate solution.

In the following Table I, the bound amount of copper and the capacity of the binder is given for up to 15 regenerations of the binder material.

TABLE I.—COPPER ACCEPTANCE BY IRON SULFIDE-CONTAINING REGENERATED CELLULOSE FIBERS IN RELATION TO THE NUMBER OF REGENERATING TREATMENTS

Amount of iron sulfide-containing fibers, 20 grams (dry basis).
Iron content of fibers, 3.22% Fe (as FeS).
Reaction temperature, 20° C.

| Number of Regeneration: | Copper Bound, Grams | Capacity of Binder Material, mval. per gram |
|---|---|---|
| 0 | 1.3126 | 2.066 |
| 1 | 1.4519 | 2.285 |
| 2 | 1.5060 | 2.370 |
| 3 | 1.8117 | 2.851 |
| 4 | 1.4684 | 2.311 |
| 5 | 1.4440 | 2.273 |
| 6 | 1.3417 | 2.112 |
| 7 | 1.3755 | 2.165 |
| 8 | 1.4718 | 2.316 |
| 9 | 1.4684 | 2.311 |
| 10 | 1.4862 | 2.339 |
| 11 | 1.4546 | 2.289 |
| 12 | 1.4486 | 2.280 |
| 13 | 1.4922 | 2.348 |
| 14 | 1.6982 | 2.673 |
| 15 | 1.5006 | 2.362 |

It will be seen that after 16 chargings of the ion binder material, 20 g. of iron sulfide-containing material will have absorbed 22.7 g. of copper which is more than the total weight of the ion-binding material, i.e. of the water swellable material, in this case regenerated cellulose staple fibers, plus the weight of the iron sulfide initially contained therein.

EXAMPLE II

A solution of 9.5% hydroxyethyl cellulose having a degree of substitution of 0.9 is produced in 7% aqueous sodium hydroxide. 3.78 g. $As_2O_3$ and 27.5 g. $Na_2S$. 9 $H_2O$ are dissolved in 70 ccm. of water, and added to 200 g. of the solution of hydroxyethyl cellulose. The thus formed mixture is introduced in droplets into a coagulating bath containing 45% by volume of water, 46% by volume of methanol and 8% by volume of glacial acetic acid, the balance being sodium acetate. In this manner, small spherical bodies of hydroxyethyl cellulose are obtained which have a yellow color due to the arsenic sulfide contained therein. The spheres are then washed with water until the spent wash water is of a neutral reaction, and the thus obtained spheres can be used as the ion binding materials similar to the material described in Example I.

3.71 g. (dry weight) of the $As_2S_3$-containing and water-swollen spheres are then reacted with ferrous ions in order to be transformed into a FeS-containing material as described in Example I. Thereafter, as described in part (b) of Example I, the spheres are charged with a $n/10$ cuprammonium solution, regenerated with hydrogen sulfide and further treated as described in Example I. The amount of copper which can be bound after each regeneration remains practically constant and, in the case of 4 regenerations equals 837 mg., 841 mg., 800 mg. and 812 mg., corresponding to a capacity of 7 mval. per gram.

EXAMPLE III

In Table II data are presented for the capacity of the iron sulfide-containing ion binder of Example I with respect to the binding of other metals, the ions of which are present in an alkaline solution.

TABLE II.—CAPACITY OF THE IRON-SULFIDE-CONTAINING ION BINDER WITH RESPECT TO COMPLEX METAL COMPOUNDS

Reaction temperature, 20° C.

| Metal Complex | FeS Containing Fibers (dry basis) Grams | Iron Content of Fibers, Percent | Metal Bound, Grams | Capacity, mval./g. |
|---|---|---|---|---|
| $Cu(NH_3)_4^{2+}$ | 22.462 | 2.684 Fe | 1.5329 Cu | 2.341 |
| $Ag(NH_3)_2^+$ | 22.92 | 3.222 Fe | 2.712 Ag | 1.097 |
| $Pb(OH)_4^{2-}$ | 23.825 | 3.243 Fe | 10.726 Pb | 4.345 |
| $Cd(NH_3)_4^{2+}$ | 23.43 | 3.074 Fe | 1.700 Cd | 1.291 |
| $Zn(NH_3)_4^{2+}$ | 23.80 | 3.86 Fe | 0.668 Zn | 0.859 |

EXAMPLE IV (a) Production of a PbS-containing ion binder.—Arsenic sulfide-containing regenerated cellulose fibers produced as described in portion (a) of Example I are reacted with an excess of lead acetate solution, for 45 minutes at a temperature of between 90 and 95° C. and in a ratio of staple fibers to the bath equal to 1:50. The thus treated staple fibers contain 13.51% lead.

(b) Binding of copper from a cuprammonium solution.—25 g. (dry weight) of the thus obtained PbS-containing fibers are used in the manner described in Example I for binding copper from an $n/10$ $(Cu(NH_3)_4)^{2+}$ solution. After saturation of the staple fibers, the same are regenerated with hydrogen sulfide and again charged with $Cu^{2+}$. After 5 chargings with $Cu^{2+}$, the material is eluated with a solution of 30 g. of NaCN and 60 g. $Na_2S.9H_2O$ in 410 ccm. of $H_2O$, whereby CuS will be decomposed, the copper will go into solution as $Na_3(Cu(CN)_4)$ while lead will remain in the fibers in the form of PbS. After 5 further chargings and regenerations, the material is again eluated with the sodium cyanide-sodium sulfide solution, and this sequence of reactions is repeated as desired.

The amount of copper which is bound in each of the binding steps and the amount of copper eluated in each of the eluating steps are indicated in Table III.

Elution of the ion binder after every 5 charges is chosen arbitrarily in order to be able to determine the capacity of the material after several elutions and thereby its practical usefulness as an ion binder.

TABLE III.—COPPER TAKEN UP BY LEAD SULFIDE CONTAINING FIBERS IN RELATION TO THE NUMBER OF REGENERATIONS AND ELUTIONS

Amount of lead sulfide-containing fibers, 25 grams (dry basis).
Lead content of fibers, 13.51% Pb (as PbS).
Reaction temperature, 20° C.

| Number of Regenerations | Copper Bound, Grams | Capacity of Binder Material mval. per Gram | Copper Bound, Grams (cumulative) | Copper Eluated, Grams |
|---|---|---|---|---|
| 0 | 1.1638 | 1.465 | 1.1638 | |
| 1 | 1.3992 | 1.762 | 2.5630 | |
| 2 | 1.4196 | 1.787 | 3.9826 | |
| 3 | 1.6438 | 2.070 | 5.6264 | |
| 4 | 1.6933 | 2.132 | 7.3197 | 7.1880 |
| 5 | 1.6178 | 2.037 | 1.6178 | |
| 6 | 1.8875 | 2.378 | 3.5053 | |
| 7 | 1.8940 | 2.385 | 5.3993 | |
| 8 | 1.8664 | 2.350 | 7.2657 | |
| 9 | 1.9045 | 2.398 | 9.1702 | 9.0076 |
| 10* | 1.4477 | 1.823 | 1.4477 | |
| 11 | 1.5648 | 1.970 | 3.0125 | |
| 12 | 1.6140 | 2.032 | 4.6265 | |
| 13 | 1.5780 | 1.987 | 6.2045 | |
| 14 | 1.6560 | 2.085 | 7.8605 | 7.7800 |

The second elution was carried out in the presence of 30 grams per liter of NaOH. This resulted in very strong swelling of the material causing a reduction of the capacity of the same after the second elution, indicated by an asterisk at the tenth regeneration. Thereafter, the capacity started to rise again.

It can be seen that after 15 charges the ion binding material is still as active as at the beginning and that during these 15 charges the total amount of bound copper (24.35 g. copper) substantially equals the weight of the ion binding material. Provided that the eluating liquid does not cause severe swelling of the material, the capacity of the binder will not be impaired by elution thereof. The precipitated copper sulfide is practically completely dissolved during the eluating steps. As indicated in Table III, it has been found that the capacity of the ion binding material increases upon repeated charging although no clear theoretical explanation for this phenomenon is offered at this time.

The method described in the example above is well suited for working-up waste waters of the copper-rayon manufacture.

EXAMPLE V

Recovery of silver from spent photographic fixing baths.—Per liter of a spent photographic fixing bath, 20 cm.³ of concentrated ammonia are added and the thus formed solution is passed through an ion binder column containing 25 g. of the lead sulfide-containing fiber material described in Example IV (a). Passage of the fixing bath through the column is terminated as soon as the liquid leaving the column is found to contain silver. The ion binder material in the column is then washed to neutrality and thereafter regenerated with hydrogen sulfide and again charged with the fixing bath solution. During the first charging, 2.924 g. silver (capacity 1.084 mval. per gram) were bound, and during the second charging 3.3111 g. (capacity 1.228 mval. per gram).

Here again it is found that the capacity of the ion binder increased after regeneration, similarly to what has been found in Example IV.

EXAMPLE VI

Binding of copper and silver from neutral and acidic sulfuric acid-containing solutions with lead sulfide.—An $n/10$ copper sulfate solution and a $n/10$ silver sulfate solution are passed over 20 grams of lead sulfide-containing fibers produced as described in Example IV (a). In two tests, the solutions are passed through the column filled with the lead sulfide-containing fibers once in neutral state—and once in the presence of $n/20$ sulfuric acid. After saturation of the ion binder material, the fibers are regenerated and again reacted with the copper and silver solutions. The respective capacities of the ion binder material will be seen from Table IV.

TABLE IV

Amount of fibers, 20 grams (dry basis).
Lead content of fibers, 13.51% Pb (as PbS).
Theoretical capacity, 1.3 mval. per gram.
Reaction temperature, 20° C.

| Metal Solution | Number of charges | | |
|---|---|---|---|
| | 1 | 2 | 3 |
| $n/10$ CuSO$_4$: | | | |
| Mg. Cu bound | 568 | 329 | 295 |
| Capacity mval./g | 0.90 | 0.52 | 0.46 |
| $n/10$ CuSO$_4$+$n/20$ H$_2$SO$_4$: | | | |
| Mg. Cu bound | 520 | 278 | 244 |
| Capacity mval./g | 0.82 | 0.44 | 0.38 |
| $n/10$ Ag$_2$SO$_4$: | | | |
| Mg. Ag bound | 3,515 | 2,885 | 2,416 |
| Capacity mval./g | 1.63 | 1.34 | 1.12 |
| $n/20$ Ag SO$_4$+$n/20$ H$_2$SO$_4$: | | | |
| Mg Ag bound | 3,561 | 2,777 | 1,987 |
| Capacity mval./g | 1.65 | 1.29 | 0.92 |

The capacity of the lead sulfide-containing ion binder with respect to $Cu^{2+}$ is smaller in a neutral pH range than in an ammoniacal solution. In the presence of sulfuric acid (pH of about 2) the capacity of the binder with respect to the binding of copper and silver is further reduced by about 10 to 15%.

Contrary to the reactions which occur in an ammoniacal medium, the capacity of the lead sulfide ion binder, when operating in a neutral or acidic range, will be reduced upon regeneration of the ion binder.

EXAMPLE VII

Binding of silver with zinc sulfide.—10 g. of dry zinc sulfide fibers, containing 6.02% zinc in the form of zinc sulfide and located in a glass tube, are used for binding silver from an $n/25$ silver nitrate solution. After washing out of the silver nitrate, the binder column is eluated with sodium-cadmium cyanide solution which, for catalyzing the reaction, contains a small proportion of hydrogen peroxide. The eluating solution is composed as follows:

15.66 grams per liter NaCN
8.0 grams per liter NaOH
8.5 grams per liter Cd(CH$_3$COO)$_2$.2H$_2$O
5 cm.$^3$ per liter H$_2$O$_2$ (30%)

To the extent to which silver sulfide is dissolved and cadmium is precipitated, the color of the initially black fibers will change to yellow. After washing out of the eluating liquid, the fibers can be charged again with silver nitrate solution.

The amount of silver which is taken up after several elutions is indicated in Table V.

TABLE V

Amount of zinc sulfide-containing fibers, 10 grams (dry basis).
Zinc content of fibers, 6.02% Zn (as ZnS).
Theoretical capacity, 1.84 mval. per gram.
Reaction temperature 20°C.

| | Silver Bound (mg.) | Capacity (mval. g.) |
|---|---|---|
| Number of Elutions: | | |
| 0 | 1,792 | 1.66 |
| 1 | 1,742 | 1.61 |
| 2 | 1,575 | 1.46 |
| 3 | 1,537 | 1.42 |
| 4 | 1,535 | 1.42 |
| 5 | 1,412 | 1.31 |
| 6 | 1,335 | 1.24 |
| 7 | 1,291 | 1.20 |
| 8 | 1,216 | 1.13 |

EXAMPLE VIII 25 g. of dry, zinc sulfide-containing regenerated cellulose having incorporated therein 6.02% of zinc in the form of zinc sulfide, are treated with an excess of $n/10$ copper sulfide solution. 1331 mg. of copper are precipated as copper sulfide, corresponding to a capacity of 1.68 mval./g. Thereafter, the binder material is eluated with a solution which contains 20 grams per liter of Zn(CH$_3$COO)$_2$.2H$_2$O), 9 grams per liter NaCN and 50 cm.$^3$ per liter of concentrated ammonia (density 0.91).

The initially black color of the cellulose will change thereby to a dirty grayish appearance. Upon renewed charging with $n/20$ CuSO$_4$, 840 mg. copper are bound. Thus, after regeneration, the capacity of the binder was dropped to 1.06 mval./g.

EXAMPLE IX

Separation of silver, copper, cadmium and nickel by selective binding of the same.—By reacting 10 g. each of dry, arsenic sulfide-containing regenerated cellulose fibers with $Cu^{2+}$, $Pb^{2+}$ and $Fe^{2+}$, three different ion binders are produced and 3 columns are then respectively charged therewith and arranged in the sequence CuS-PbS-FeS, so that the solution from which metal ions are to be removed will pass through all 3 columns in the indicated sequence. The thus arranged series of ion binding columns is then charged with an ammoniacal solution of 0.8 grams AgNO$_3$, 1.2 grams CuSO$_4$.5H$_2$O, 1.25 grams Cd(CH$_3$COO)$_2$·2H$_2$O and 1.3 grams NiSO$_4$.7H$_2$O, and washed after passage of the solution through the series of columns has been completed.

The solution leaving the copper sulfide column is free of silver, however, it does contain copper, cadmium and nickel. The solution leaving the lead sulfide column is free of copper but contains cadmium and nickel. The solution leaving the iron sulfide column is free of cadmium but gives a positive qualitative nickel test.

In this manner it is thus possible to quantitatively separate the four metallic components of the solution.

If the copper sulfide-containing binder material which serves for binding silver contains also lead hydroxide, which can be accomplished by reacting lead sulfide-containing fibers with $(Cu(NH_3)_4)^{2+}$, then it is possible to regenerate the binder material in such a manner that after exhaustion of the material, the Pb(OH)$_2$ of the same is converted into PbS, and the material is then again treated with $(Cu(NH_3)_4)^{2+}$. The copper sulfide formed thereby may serve for binding additional silver ions.

The amount of arsenic trioxide or other arsenic or antimony compounds which is initially incorporated in the fibers or the like should not exceed about 15% of the weight of the alpha cellulose, since fibers having a higher arsenic or antimony compound content will not possess the desired strength during the spinning process and will be of inferior quality.

However, the percentage amount of arsenic or antimony sulfide in the fiber will control the amount of heavy metal sulfide which can be incorporated in the fiber by reacting the antimony or arsenic sulfide-containing fiber with heavy metal salts.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A method of separating cations from an aqueous solution containing the same and incorporating said cations in a shaped body, comprising the step of contacting an aqueous solution containing in solution a first cation adapted to form a sulfide which is at most slightly soluble in water, with a shaped body of a material adapted to swell in contact with water and having distributed therethrough a sulfide including a cation of lesser affinity to ionic sulfide radicals than said first cation and of greater solubility in water than the sulfide of said first cation, so that said shaped body will swell and the sulfide of said first cation will be precipitated throughout said shaped body thus separating said first cation from said aqueous solution and incorporating the sulfide of said first cation in said shaped body.

2. A method as defined in claim 1, wherein said sulfide including a cation of lesser affinity to ionic sulfide radicals is distributed through said shaped body in the form of grains of said sulfide.

3. A method as defined in claim 1, wherein said aqueous solution is an alkaline solution, and said material of said shaped body is selected from the group consisting of regenerated cellulose and water soluble cellulose derivatives.

4. A method as defined in claim 1, wherein said shaped body is a mass of coagulated substantially spherical bodies.

5. A method as defined in claim 1, wherein said aqueous solution also contains an anion adapted to form a substantially water-insoluble compound with at least one cation selected from the group consisting of iron and lead, and wherein the precipitated sulfide is selected from the group consisting of iron sulfide and lead sulfide and adapted to form a substantially water-insoluble compound with said anion.

6. A method as defined in claim 5, wherein said shaped body is an extruded body.

7. A method as defined in claim 1, wherein the cation of said sulfide of greater solubility will form an insoluble compound distributed throughout said body, and including the step of treating said body having said insoluble compound distributed therethrough with a substance selected from the group consisting of hydrogen sulfide and highly water soluble sulfides so as to form a sulfide of said insoluble compound, thus regenerating the sulfide of greater solubility in said body.

8. A method as defined in claim 1 and including the step of treating said shaped body having said sulfide of said first cation incorporated therein with a solution of a complex-forming compound adapted to dissolve at least one of the metal compounds in said body.

9. A method as defined in claim 8, wherein said treating with a solution of a complex-forming compound is carried out with an aqueous solution containing an alkali metal cyanide.

10. A method as defined in claim 8, wherein said treating with a solution of a complex-forming compound is carried out with an aqueous solution containing an alkali metal cyanide and an alkali metal sulfide.

11. A method as defined in claim 1, and including the step of treating said shaped body having said sulfide of said first cation incorporated therein, with an aqueous solution containing an alkali metal cyanide as a complex-forming compound adapted to dissolve at least one of the metal compounds in said body, and also containing cations of a metal adapted to form with sulfide ions a sulfide which is at most slightly soluble in water.

References Cited

UNITED STATES PATENTS

| | | | |
|---|---|---|---|
| 1,332,974 | 3/1920 | Dennison | 8—52 X |
| 1,332,982 | 3/1920 | Gibbons | 8—52 X |
| 3,347,968 | 10/1967 | Thomas et al. | 264—195 |

SAMIH N. ZAHARNA, *Primary Examiner.*